United States Patent [19]
Foster et al.

[11] Patent Number: 6,038,630
[45] Date of Patent: Mar. 14, 2000

[54] SHARED ACCESS CONTROL DEVICE FOR INTEGRATED SYSTEM WITH MULTIPLE FUNCTIONAL UNITS ACCESSING EXTERNAL STRUCTURES OVER MULTIPLE DATA BUSES

[75] Inventors: Eric M. Foster, Owego; Dennis E. Franklin; Stefan P. Jackowski, both of Endicott, all of N.Y.; David Wallach, Raleigh, N.C.

[73] Assignee: International Business Machines Corporation, Armonk, N.Y.

[21] Appl. No.: 09/047,139

[22] Filed: Mar. 24, 1998

[51] Int. Cl.[7] .................................................. G06F 13/00
[52] U.S. Cl. .......................... 710/132; 710/21; 710/22; 710/23; 710/52; 710/127; 710/128; 710/131; 711/100; 711/147; 711/150; 711/211; 709/231; 340/825.8
[58] Field of Search ..................................... 710/132, 131, 710/21, 20, 27, 37, 38, 22, 23, 52, 128, 127; 712/33, 235; 711/100, 147, 150, 211; 340/825.8

[56] References Cited

U.S. PATENT DOCUMENTS

| | | | |
|---|---|---|---|
| 3,810,105 | 5/1974 | England | 340/172.5 |
| 4,713,748 | 12/1987 | Magar et al. | 364/200 |
| 4,901,230 | 2/1990 | Chen et al. | 711/149 |
| 4,912,636 | 3/1990 | Magar et al. | 364/200 |
| 4,968,977 | 11/1990 | Chinnaswamy et al. | 340/825.8 |
| 5,175,841 | 12/1992 | Magar et al. | 395/425 |
| 5,392,446 | 2/1995 | Tower et al. | 712/1 |
| 5,577,230 | 11/1996 | Argade et al. | 395/477 |
| 5,636,361 | 6/1997 | Ingerman | 395/477 |
| 5,638,520 | 6/1997 | Moyer | 395/308 |
| 5,664,223 | 9/1997 | Bender et al. | 395/842 |
| 5,708,784 | 1/1998 | Yanai et al. | 395/299 |
| 5,805,821 | 9/1998 | Saxena et al. | 709/231 |

OTHER PUBLICATIONS

Stauffer, D., Schiller, C., Adlnolfe, N. & Parash, A., "System–Level Integration for Set–top Boxes," Communication Systems Design, vol. 4, No. 1, p. 37–41 (Jan. 1988).

'97 Semiconductor System Solution Symposium, Next Generation Multi–Function TV and Multimedia, Nov. 13, 1997, Pacifica Yohohama Convention Center.

*Primary Examiner*—Ayaz R. Sheikh
*Assistant Examiner*—Frantz Blanchard Jean
*Attorney, Agent, or Firm*—Heslin & Rothenberg, P.C.

[57] ABSTRACT

A multi-path access control device for an integrated system is presented which allows simultaneous access to multiple external devices coupled thereto by multiple functional units. The multiple functional units are coupled to the shared access control device across two or more high speed, shared data buses. The control device includes multiple bus ports, each coupled to a different data bus, and a non-blocking crossbar switch coupled to the bus ports for controlling forwarding, with zero cycle latency, of requests from the functional units. Multiple external device ports are coupled to the non-blocking crossbar switch for receiving requests forwarded by the crossbar switch, and each external device is coupled to a different external device port. The crossbar switch allows multiple requests at the bus ports directed to different external devices to be forwarded to different external device ports for simultaneous accessing of different external devices coupled thereto pursuant to the multiple requests.

22 Claims, 3 Drawing Sheets

SHARED ACCESS CONTROL DEVICE FOR INTEGRATED SYSTEM WITH MULTIPLE FUNCTIONAL UNITS ACCESSING EXTERNAL STRUCTURES OVER MULTIPLE DATA BUSES

TECHNICAL FIELD

This invention relates generally to data request handling and processing within integrated systems, and more particularly, to a common access control function for an integrated system which allows concurrent accessing of multiple external structures, such as external memories, by multiple functional units of the integrated system.

BACKGROUND OF THE INVENTION

Multiple functions are today commonly being integrated onto a single system chip. When initially defining architecture for integration of multiple discrete components onto a single chip, access to external devices can be a critical issue. For example, an MPEG video decoder system often employs external memory for various data areas, or buffers such as frame buffers. This external memory is typically implemented using either DRAM or SDRAM technology. In the decoder system, a video decode unit requires immediate access to external memory when needed to prevent starving the video display or on-screen graphics. If the video decoder's request for data is delayed, the picture could be corrupted. Likewise, an on-chip processor, if held from accessing external memory when needed could experience significant performance degradation.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach can be less than optimal. For example, although each function will have complete access to its own external memory area, there is no shared access between functions of the integrated system. Thus, transferring data from one memory area to another memory area of the system is often needed. This obviously increases data transfers and can thus degrade performance of the overall system, i.e., compared with a shared memory system.

Another approach is to employ a single common bus within the integrated system which allows one or more functional units of the system to communicate to external memory through a single port. Although allowing the sharing of memory, the difficulty with this approach arises when many functions are integrated onto a single chip, with each function requiring a certain amount of bandwidth for accessing off-chip data. In implementation, the bandwidth of the single data bus needs to be sufficient to accommodate all functional units communicating through the bus. This bandwidth requirement can become prohibitive. For example, in a video decode system, a video decode unit may require 100 Mbytes/sec of bandwidth, while a transport unit may require up to 5 Mbytes/sec of bandwidth, a processor unit up to 50 Mbytes/sec and an audio decoder up to 5 Mbytes/sec. Thus, with a single data bus serving these functional units, 160 Mbytes/sec of bandwidth would be needed. Further, in this example, each functional unit may be required to possess a large amount of internal buffering to span the time gap between memory accesses resulting from having multiple functions sharing communications through the single bus. These bandwidth and buffer requirements associated with the single bus implementation make the single bus/port implementation less than ideal for today's ever more integrated technologies.

Therefore, there exists a need in the art for an enhanced shared access control approach for an integrated system which allows multiple functions of the integrated system to simultaneously access different external devices through multiple ports while avoiding the performance degradation and increased costs inherent in a separate, dedicated port approach to accessing the external devices.

DISCLOSURE OF THE INVENTION

Briefly summarized, this invention comprises in one aspect a multi-path access control device which allows simultaneous accessing of multiple external devices, to be coupled to the control device, by multiple functional units connected to the control device. The control device includes multiple bus ports coupled to multiple data buses, wherein each bus port receives signals from a different data bus, and the functional units are coupled to the data buses for sending requests thereon to access the multiple external devices. A non-blocking crossbar switch is coupled to the bus ports for receiving and controlling forwarding of requests from the functional units. Multiple external device ports, coupled to the non-blocking crossbar switch, receive requests forwarded by the crossbar switch from the functional units, wherein the non-blocking crossbar switch allows multiple requests at the bus ports to be directed to different external devices simultaneously.

In another aspect, an integrated system is provided which includes multiple data buses and multiple functional units coupled to the data buses for sending requests thereon to access external devices to be coupled to the integrated system. A shared, multi-path access control device is included which has multiple bus ports coupled to receive requests from the data buses, and a non-blocking crossbar switch coupled to the multiple bus ports for receiving and controlling forwarding of requests. Multiple external device ports are connected to the non-blocking crossbar switch for receiving requests forwarded by the crossbar switch. When in use, the non-blocking crossbar switch allows a request at any bus port to be sent to any external device port of the multi-path access control device, and allows multiple requests directed to different external devices to be simultaneously forwarded for concurrent accessing of the different external devices.

To restate, this invention encompasses a shared, multi-path access control device for an integrated system having several functions on a single chip where the functions access multiple external devices through two or more shared data buses. Advantageously, the shared access control device allows multiple requests on different data buses to simultaneously access there through the different external devices coupled to the control device. There is zero cycle latency through the control device so that maximum throughput is achieved with relatively low interference.

Different technology devices, such as different memory devices, can be coupled to different external device ports of the shared access control device. Thus, a functional unit on one of the data buses can simultaneously access one memory coupled to the shared control device, while a second functional unit on a second data bus accesses a different memory coupled to the shared control device. From the functional unit's perspective, the multiple memories coupled to the shared access control device appear as a "single" memory space. Further, any functional unit can access any portion of this "single" memory space.

In comparison with a single shared bus and single shared external port, the two or more shared data buses coupled to the shared multi-path access control device of this invention each have lower bandwidth requirements and the functional units coupled thereto can have smaller buffer sizes. The invention increases usable bandwidth of the data buses by allowing concurrent accesses of requests from different data buses to different external devices. Again, flexibility is enhanced by allowing attachment of different device technologies to the integrated system through the external ports, thereby helping to hold costs to a minimum.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
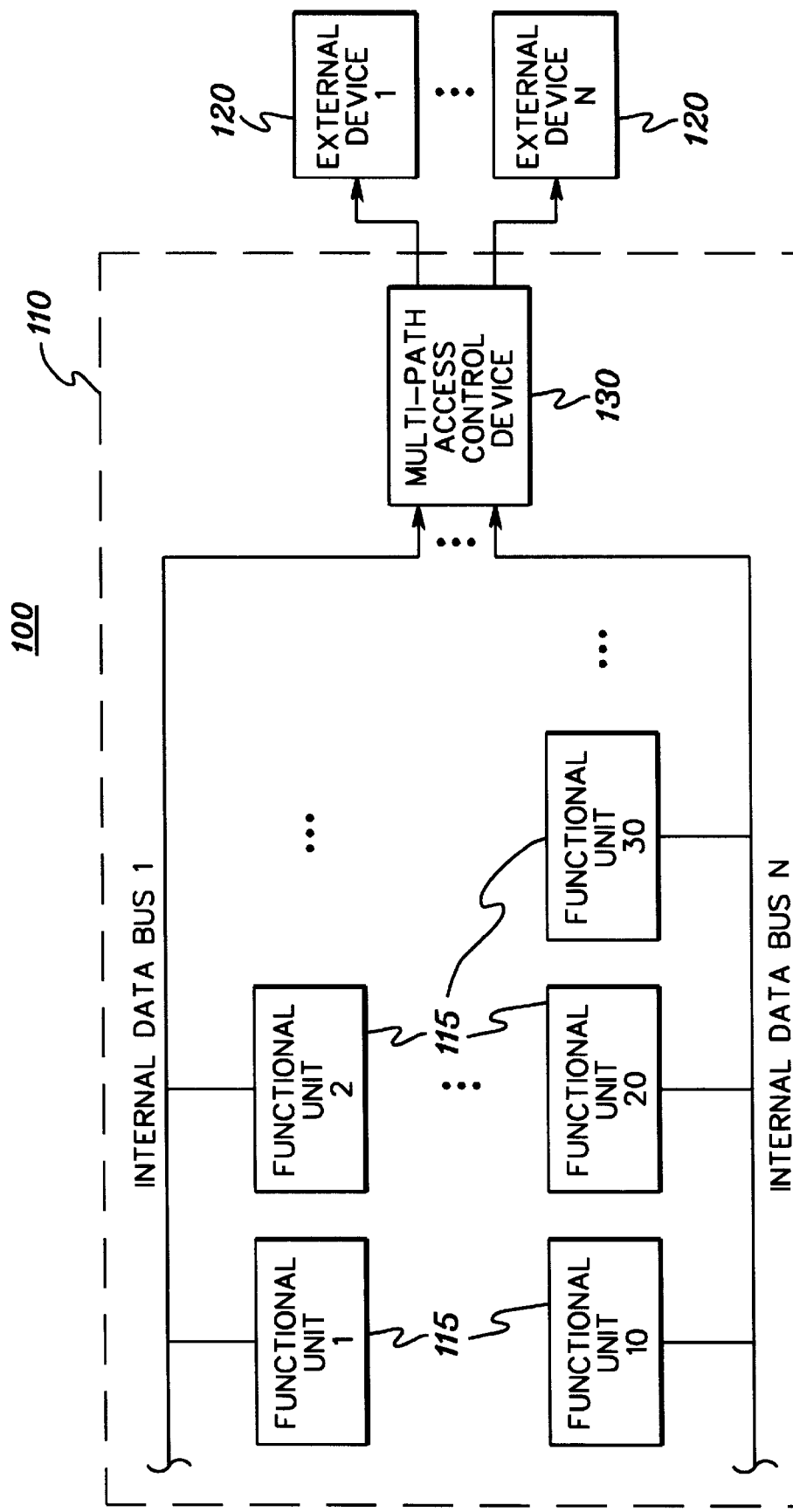
FIG. 1 depicts one embodiment of an architecture 100 having a multi-function integrated system 110 with multiple external devices 120 coupled thereto, wherein communication with devices 120 is through a shared, multi-path access control device 130 in accordance with the principles of the present invention.

Generally stated, this invention is targeted to integrated systems having several functions on a single chip wherein the functions access multiple external devices. Pursuant to the invention, a shared, multi-path access control device is employed between multiple, shared internal data buses of the integrated system and multiple ports to the external devices. This control device allows a request on any internal data bus to be sent to any device port. Further, the control device allows multiple requests directed to different external devices to be simultaneously forwarded from multiple internal data buses to the appropriate external device ports for simultaneous (or same cycle) accessing of the different external devices. FIG. 1 depicts one embodiment of these general concepts of the present invention.

In FIG. 1, an architecture 100 includes an integrated system 110, such as an integrated circuit chip, having multiple functional units 115 which read/write access a plurality of external devices 120 coupled to the system 110. As used herein, a 'functional unit' is anything that can act as a master and request a read or write cycle from a slave device, such as memory. Requests from functional units 115 are fed through a multi-path access control device 130 constructed in accordance with the principles of the present invention. Significant to this invention is the use of more than one high speed, internal data bus (internal data bus 1, . . . , internal data bus n) and the existence of multiple external devices 120 (external device 1, . . . , external device N) to which requests on the data buses are addressed.

Note that one or more of the internal data buses may be coupled to a single functional unit 115, or alternatively, each internal data bus may have two or more functional units coupled thereto. Additionally, the depicted internal data buses in practice may each comprise an associated read data bus and write data bus. Further, the number n of internal data buses may be the same as the number N of external devices or different. However, the ability to simultaneously process multiple requests for access to different external devices can depend upon both the number of internal data buses and the number of external devices to be concurrently accessed. For example, if there are two internal data buses and two external devices to be accessed, then two requests can be processed in parallel, while if there are three internal data buses and four external devices, then three requests can be processed in parallel.

Figure 2:
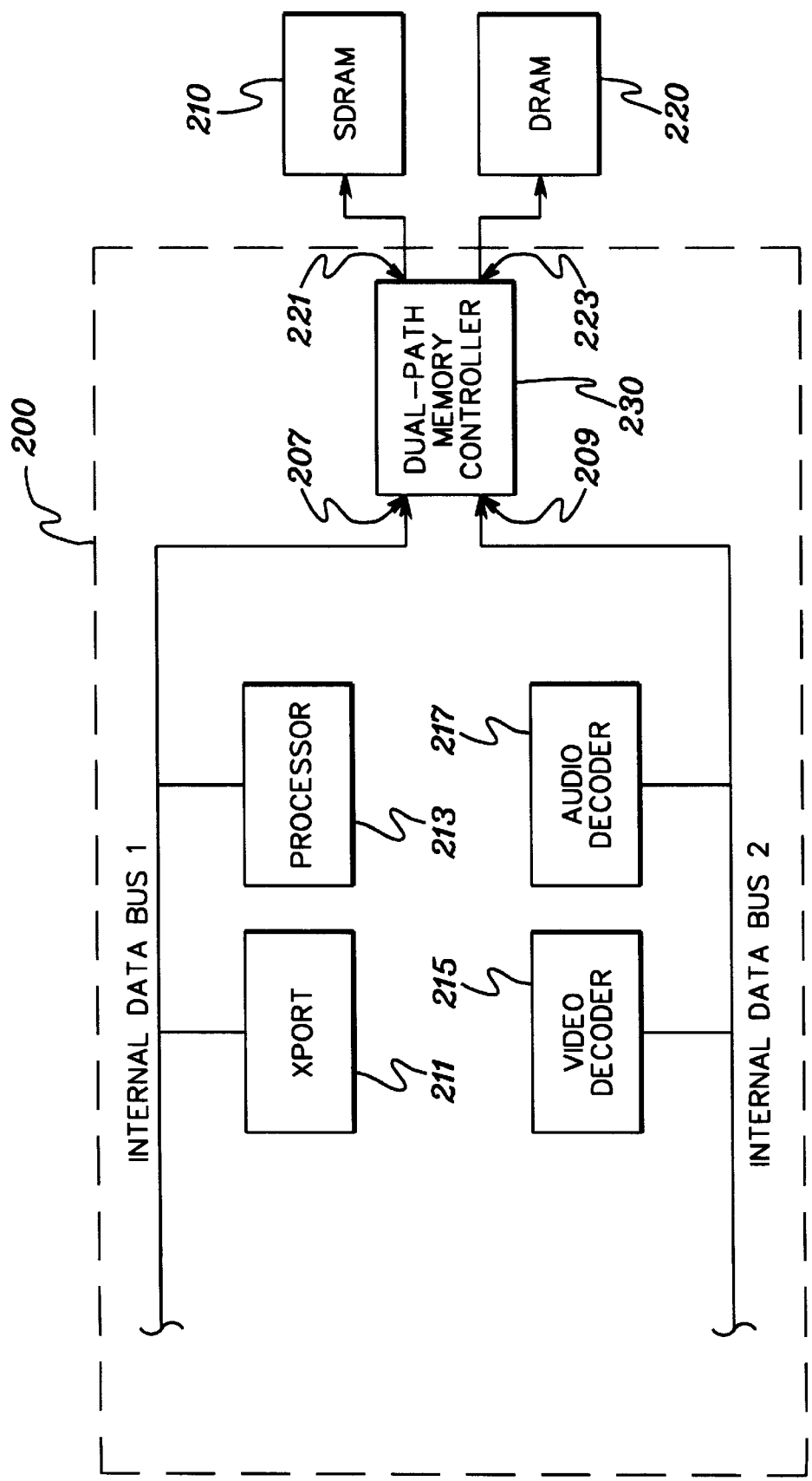
FIG. 2 depicts an example of an integrated system chip 200 coupled to external memories 210,220 and having a shared, dual path memory controller 230 for accessing the memories in accordance with the principles of the present invention.

An example of an integrated architecture in accordance with the present invention for a "set top box" used in processing digital television signals is depicted in FIG. 2. In this architecture, an integrated system 200 comprises two primary internal data buses (i.e., internal data bus 1 & internal data bus 2), each of which may comprise a write data bus and a read data bus as noted above. Coupled to internal data bus 1 is a transport or XPORT 211 function which outputs requests through the data bus to the external device ports 221 & 223 of system 200. Similarly, a processor 213 is coupled to internal data bus 1, and video decoder 215 and audio decoder 217 functions are coupled to internal data bus 2. Data bus 1 is connected to a first bus port 207 of a dual path memory controller 230 implemented in accordance with the principles of the present invention, while data bus 2 is coupled to a second bus port 209. Shared control 230 in this embodiment includes a dual ported switch with two ports on each side of the controller. The external device ports 221 & 223 are coupled to high speed memory SDRAM 210 and DRAM 220, respectively, as well as if desired, to a bus (not shown) to which other devices can be attached.

This FIG. 2 configuration/design allows one or more functional unit on an internal data bus (having both read and write buses) to concurrently access memory at different external device ports 221 & 223 or allows another functional unit on another internal bus to simultaneously therewith access memory through a different one of the external device ports 221, 223. Thus, in accordance with the invention, maximum throughput with little or no latency/interference per cycle can be attained. Further, this approach advantageously allows mixing of different memory technologies and/or different types of external devices, which may assist in minimizing costs of the overall architecture.

The access control device 230 presents the appearance of a common address space to the functional units of the integrated system since all requests are through the multi-path access control device. There are several cases of access to the external device ports through which no interference happens between the data buses, namely:

A data bus 1 request to SDRAM, while data bus 2 requests DRAM,

A data bus 1 request to DRAM, while data bus 2 requests SDRAM,

A data bus 1 read request to DRAM, while data bus 1 write requests to SDRAM,

A data bus 1 read request to SDRAM, while data bus 1 write requests to DRAM,

A data bus 2 read request to DRAM, while data bus 2 write requests to SDRAM,

A data bus 2 read request to SDRAM, while data bus 2 write requests to DRAM.

Again, zero cycle latency through the control device 230 can be readily achieved in hardware based on the information provided herein, which allows subsequent requests to happen without delay.

Figure 3:
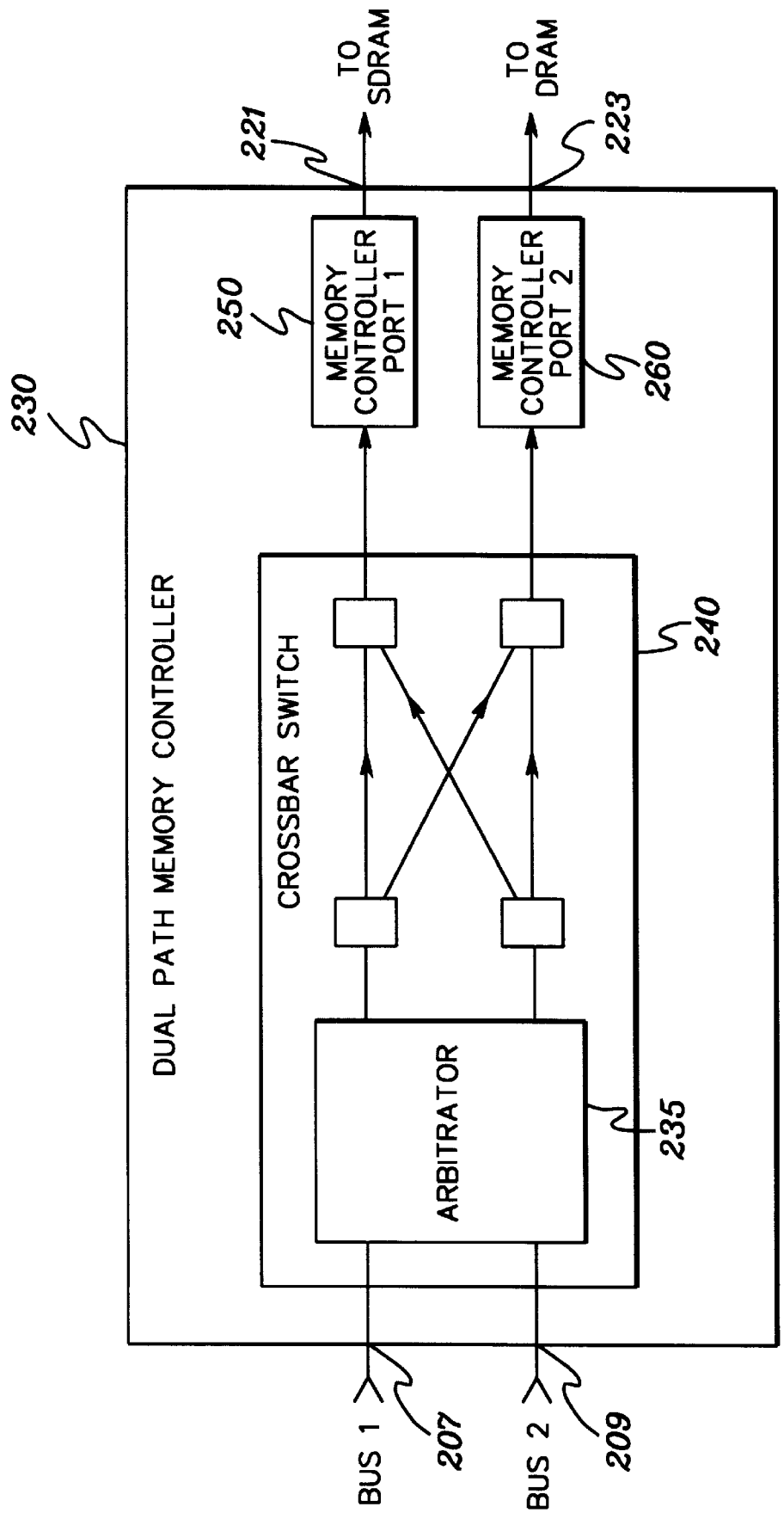
FIG. 3 is a diagram of one embodiment of dual path memory controller 230 of FIG. 2 in accordance with the present invention.

FIG. 3 depicts one embodiment of a dual path memory controller 230 in accordance with the present invention. In this embodiment, two bus ports 207 & 209 are at one side of the control device, and two external device ports 221 & 223 are at the other. Significant to the control device is a non-blocking crossbar switch 240 which receives requests from the dual bus ports (through an arbitrator 235) and forwards the requests as appropriate to the external device ports 221 & 223 across respective memory controllers 250 & 260 coupled between the crossbar switch and the memory ports.

Note the data movement on an internal data bus is handled through master/slave communication. A master will request a read or write cycle (or cycles) from a slave device. In the case of multiple masters, there is also an arbitration scheme on the bus itself to determine which master function has priority when there are concurrent requests. When applied to the present invention, a master on one of the internal data buses gains control of the bus and requests a read or a write cycle from the slave interface in the crossbar switch. Within the crossbar, this in translated to the master interface of the correct output port, which in turn passes the request to the slave interface of the associated memory controller (250, 260).

A crossbar switch 240 for implementation in this invention will be understood by those skilled in the art through reference to similar type structures used in communication technologies. The crossbar switch may accommodate a wide number of bus ports and a large number of external device ports as desired for a given architecture. For example, 2 by 2 up to 64 by 64 crossbar switches are known in the communications art. Further, as noted above, the number of bus ports may exceed or be less than the number of external device ports.

Arbitrator 235, which can be implemented using any one of various arbitration schemes, handles external device access when two or more requests are concurrently received for access to the same external device. For example, in an interference situation, the request of bus 1 may be given priority, while the request of bus 2 is held in a buffer within arbitrator 235. Additionally, if desired, interrupt hardware could be implemented so that a second request may assume priority and interrupt processing of a first request. Arbitrator 235 is in addition to any arbitration scheme for a data bus having multiple functional units.

Those skilled in the art will note from the above-description that this invention encompasses a shared, multi-path access control device for an integrated system having several functions on a single chip where the functions access multiple external devices through two or more shared data buses. Advantageously, the shared access control device allows multiple requests on different data buses to simultaneously access there through the different external devices coupled to the control device. There is zero cycle latency through the control device so that maximum throughput is achieved with relatively low interference. (Zero latency obviously assumes that there is no interference between different requests on multiple buses coupled to the multi-path access control device.)

Different technology devices, such as different memory technology devices, can be coupled to different external device ports of the shared access control device. Thus, a functional unit on one of the data buses can simultaneously access one memory technology coupled to the shared control device, while a second functional unit on a second data bus accesses a different memory technology coupled to the shared control device. From the functional unit's perspective, the multiple memories coupled to the shared access control device appear as a "single" memory space. Further, any functional unit can access any portion of this "single" memory space.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A multi-path access control device allowing simultaneous accessing of multiple external devices to be coupled thereto by multiple functional units coupled to said multi-path access control device, said multi-path access control device comprising:

multiple bus ports coupled to multiple data buses, each bus port receiving requests from a different data bus, and wherein said multiple functional units are coupled to said multiple data buses for sending requests thereon for access to said multiple external devices, wherein at least one data bus of said multiple data buses has at least two functional units of said multiple functional units coupled thereto;

a non-blocking crossbar switch coupled to said multiple bus ports for receiving and controlling forwarding of requests from said multiple functional units; and multiple external device ports coupled to said non-blocking crossbar switch for receiving requests forwarded by said non-blocking crossbar switch from said multiple functional units, wherein multiple requests at said multiple bus ports directed to different external devices can be simultaneously forwarded by said non-blocking crossbar switch through different external device ports of said multiple external device ports for simultaneous accessing of said different external devices pursuant to said multiple requests.

2. The multi-path access control device of claim 1, wherein said multiple external devices comprise multiple memory devices, each memory device being coupled to a different external device port of said multiple external device ports, and wherein said multi-path access control device comprises a shared, multi-path memory control device.

3. The multi-path access control device of claim 2, wherein at least some memory devices of said multiple memory devices comprise different memory device types.

4. The multi-path access control device of claim 2, further comprising multiple memory control units, each memory control unit being coupled to a different external device port of said multiple external device ports for processing requests to a corresponding memory device coupled to said external device port.

5. The multi-path access control device of claim 2, wherein said multiple functional units, said multiple data buses, and said multi-path access control device comprise on-chip structures of an integrated system.

6. The multi-path access control device of claim 1, wherein said non-blocking crossbar switch allows a request at any bus port to be sent to any external device port of the multi-path access control device so that a request on any data bus can be sent to any external device of the multiple external devices.

7. The multi-path access control device of claim 1, wherein said non-blocking crossbar switch further comprises an arbitrator for arbitrating access to said different external devices by said multiple functional units including by said at least two functional units coupled to said at least one data bus of said multiple data buses.

8. The multi-path access control device of claim 7, wherein said multiple bus ports comprise X bus ports, and said multiple external device ports comprise Y external device ports, and wherein X≠Y.

9. The multi-path access control device of claim 7, wherein said multiple bus ports comprise X bus ports, and said multiple external device ports comprise Y external device ports, and wherein X=Y.

10. A multi-path access control device allowing simultaneous accessing of multiple external devices to be coupled thereto by multiple functional units coupled to said multi-path access control device, said multi-path access control device comprising:

multiple bus ports coupled to multiple data buses, each bus port receiving requests from a different data bus, and wherein said multiple functional units are coupled to said multiple data buses for sending requests thereon for access to said multiple external devices;

a non-blocking crossbar switch coupled to said multiple bus ports for receiving and controlling forwarding of requests from said multiple functional units;

multiple external device ports coupled to said non-blocking crossbar switch for receiving requests forwarded by said non-blocking crossbar switch from said multiple functional units, wherein multiple requests at said multiple bus ports directed to different external devices can be simultaneously forwarded by said non-blocking crossbar switch through different external device ports of said multiple external device ports for simultaneous accessing of said different external devices pursuant to said multiple requests;

wherein said multiple external devices comprise multiple memory devices, each memory device being coupled to a different external device port of said multiple external device ports, and wherein said multi-path access control device comprises a shared, multi-path memory control device;

wherein said multiple functional units, said multiple data buses, and said multi-path access control device comprise on-chip structures of an integrated system; and wherein said integrated system comprises an MPEG decoder system, and wherein said multiple functional units comprise a transport unit, a microprocessor, a video decoder and an audio decoder, and wherein said multiple memory devices comprise DRAM and SDRAM coupled to said external device ports.

11. The multi-path access control device of claim 10, wherein said transport unit and said processor are coupled to a first data bus of said multiple data buses, and said video decoder and said audio decoder are coupled to a second data bus of said multiple data buses, and wherein said multi-path access control device allows any request on said first data bus or said second data bus to be sent to either said DRAM or said SDRAM.

12. The multi-path access control device of claim 11, wherein a request on said first data bus to access said SDRAM and a request on said second data bus to access said DRAM can be processed simultaneously by said non-blocking crossbar switch with zero latency so that said request on said first data bus is processed to access said SDRAM simultaneous with said request on said second data bus being processed to access said DRAM.

13. A multi-path access control device allowing simultaneous accessing of multiple external devices to be coupled thereto by multiple functional units coupled to said multi-path access control device, said multi-path access control device comprising:

multiple bus ports coupled to multiple data buses, each bus port receiving requests from a different data bus, and wherein said multiple functional units are coupled to said multiple data buses for sending requests thereon for access to said multiple external devices;

a non-blocking crossbar switch coupled to said multiple bus ports for receiving and controlling forwarding of requests from said multiple functional units; and multiple external device ports coupled to said non-blocking crossbar switch for receiving requests forwarded by said non-blocking crossbar switch from said multiple functional units, wherein multiple requests at said multiple bus ports directed to different external devices can be simultaneously forwarded by said non-blocking crossbar switch through different external device ports of said multiple external device ports for simultaneous accessing of said different external devices pursuant to said multiple requests; and wherein each data bus of said multiple data buses comprises an associated read bus and write bus, and wherein a read request on one read bus and a write request on its associated write bus can simultaneously access through said non-blocking crossbar switch different external devices of said multiple external devices.

14. An integrated system comprising:

multiple data buses;

multiple functional units coupled to said multiple data buses for sending requests thereon to access external devices to be coupled to the integrated system, wherein at least one data bus of said multiple data buses has at least two functional units of said multiple functional units coupled thereto; and a shared, multi-path access control device comprising:
(i) multiple bus ports coupled to said multiple data buses for receiving requests therefrom to access said external devices,
(ii) a non-blocking crossbar switch coupled to said multiple bus ports for receiving and controlling forwarding of requests received at said multiple bus ports, and
(iii) multiple external device ports coupled to said non-blocking crossbar switch for receiving requests forwarded by said non-blocking crossbar switch from said multiple functional units, each external device port to be coupled to a different external device, wherein multiple requests at said multiple bus ports directed to different external devices can be simultaneously forwarded by said non-blocking crossbar switch to different external device ports of said multiple external device ports for simultaneous accessing of said different external devices.

15. The integrated system of claim 14, wherein said non-blocking crossbar switch allows a request at any bus port of said multiple bus ports to be sent to any external device port of the multiple external device ports of the multi-path access control device.

16. The integrated system of claim 14, wherein said external devices comprise multiple memory devices, and wherein said multi-path access control device comprises a shared, multi-path memory control device for coordinating same cycle access to said multiple memory devices by multiple requests received at said multiple bus ports.

17. The integrated system of claim 16, wherein at least some memory devices of said multiple memory devices comprise different memory device types, each memory device being coupled to a different external device port of said multiple external device ports.

18. The integrated system of claim 16, further comprising multiple memory control units, each memory control unit being coupled to a different external device port of said multiple external device ports for processing requests forwarded from said non-blocking crossbar switch to access a corresponding memory device coupled to said external device port.

19. The integrated system of claim 14, wherein said non-blocking crossbar switch further comprises an arbitrator for arbitrating access to said different external devices by said multiple functional units including by said at least two functional units coupled to said at least one data bus of said multiple data buses.

20. The integrated system of claim 19, wherein each data bus of said multiple data buses has at least two functional units of said multiple functional units coupled thereto.

21. An integrated system comprising:

multiple data buses;

multiple functional units coupled to said multiple data buses for sending requests thereon to access external devices to be coupled to the integrated system; and a shared, multi-path access control device comprising:
(i) multiple bus ports coupled to said multiple data buses for receiving requests therefrom to access said external devices,
(ii) a non-blocking crossbar switch coupled to said multiple bus ports for receiving and controlling forwarding of requests received at said multiple bus ports, and
(iii) multiple external device ports coupled to said non-blocking crossbar switch for receiving requests forwarded by said non-blocking crossbar switch from said multiple functional units, each external device port to be coupled to a different external device, wherein multiple requests at said multiple bus ports directed to different external devices can be simultaneously forwarded by said non-blocking crossbar switch to different external device ports of said multiple external device ports for simultaneous accessing of said different external devices; and wherein at least some data buses of said multiple data buses comprise a read bus and a write bus, and wherein a read request on one read bus and a write request on its associated write bus can simultaneously access through said non-blocking crossbar switch different external devices of said multiple external devices.

22. An integrated system comprising:

multiple data buses;

multiple functional units coupled to said multiple data buses for sending requests thereon to access external devices to be coupled to the integrated system; and a shared, multi-path access control device comprising:
(i) multiple bus ports coupled to said multiple data buses for receiving requests therefrom to access said external devices,
(ii) a non-blocking crossbar switch coupled to said multiple bus ports for receiving and controlling forwarding of requests received at said multiple bus ports, and
(iii) multiple external device ports coupled to said non-blocking crossbar switch for receiving requests forwarded by said non-blocking crossbar switch from said multiple functional units, each external device port to be coupled to a different external device, wherein multiple requests at said multiple bus ports directed to different external devices can be simultaneously forwarded by said non-blocking crossbar switch to different external device ports of said multiple external device ports for simultaneous accessing of said different external devices;

wherein said external devices comprise multiple memory devices, and wherein said multi-path access control device comprises a shared, multi-path memory control device for coordinating same cycle access to said multiple memory devices by multiple requests received at said multiple bus ports; and wherein said integrated system comprises an MPEG decoder system, and wherein said multiple memory devices comprise off-chip memory devices, said off-chip memory devices including DRAM and SDRAM.

* * * * *